(12) United States Patent
Yeh

(10) Patent No.: US 9,365,257 B2
(45) Date of Patent: Jun. 14, 2016

(54) PIVOT ANGLE SETTING MECHANISM

(71) Applicant: Ching-Ho Yeh, Taichung (TW)

(72) Inventor: Ching-Ho Yeh, Taichung (TW)

( * ) Notice: Subject to any disclaimer, the term of this patent is extended or adjusted under 35 U.S.C. 154(b) by 0 days.

(21) Appl. No.: 14/965,908

(22) Filed: Dec. 11, 2015

(65) Prior Publication Data

US 2016/0096581 A1   Apr. 7, 2016

(51) Int. Cl.
*A63C 17/06*   (2006.01)
*B62K 21/18*   (2006.01)
*B62K 3/00*   (2006.01)

(52) U.S. Cl.
CPC .................. *B62K 21/18* (2013.01); *B62K 3/002* (2013.01)

(58) Field of Classification Search
CPC ................................ B60K 21/18; B60K 3/002
See application file for complete search history.

(56) References Cited

U.S. PATENT DOCUMENTS

| | | | | |
|---|---|---|---|---|
| 5,263,725 A | * | 11/1993 | Gesmer | A63C 17/0093 280/11.28 |
| 8,801,008 B2 | * | 8/2014 | Wilson | A63C 17/006 280/11.28 |
| 2009/0256325 A1 | * | 10/2009 | Dickie | A63C 17/0066 280/87.042 |
| 2012/0146249 A1 | * | 6/2012 | Sugishita | F02B 25/22 261/61 |

\* cited by examiner

*Primary Examiner* — John Walters
*Assistant Examiner* — James Triggs

(57) ABSTRACT

A pivot angle setting mechanism of a steering bar of a push scooter is described and includes a mount secured to a front end of the push scooter, the mount including a central hole and two openings each between the central hole and either end, each opening having two parallel projections; two sliding members each including a cavity on one end, three parallel grooves on the other end wherein two of the grooves complimentarily engage the projections respectively, and a channel communicating the cavity with a central one of the grooves; two limit members each including a concave surface and a hollow peg in the opening; and two spring biased pins each disposed in the cavity and having a shank fastened in the hollow peg by passing through the channel.

1 Claim, 4 Drawing Sheets

PIVOT ANGLE SETTING MECHANISM

BACKGROUND OF THE INVENTION

1. Field of the Invention

The invention relates to push scooters and more particularly to a pivot angle setting mechanism of a steering bar of a push scooter.

2. Description of Related Art

A conventional push scooter comprises a deck and a steering bar pivotally secured to the deck. However, a pivot angle of the steering bar cannot be set.

Thus, the need for improvement still exists.

SUMMARY OF THE INVENTION

It is therefore one object of the invention to provide a pivot angle setting mechanism comprising a mount secured to a front end of a push scooter, the mount including a central hole and two openings each between the central hole and either end, each opening having two parallel projections on two sides respectively; two sliding members each including a cavity on one end, three parallel grooves on the other end wherein two of the grooves complimentarily engage the projections respectively, and a channel communicating the cavity with a central one of the grooves; two limit members each including a concave surface and a hollow peg in the opening; and two spring biased pins each disposed in the cavity and having a shank fastened in the hollow peg by passing through the channel.

The above and other objects, features and advantages of the invention will become apparent from the following detailed description taken with the accompanying drawings.

DETAILED DESCRIPTION OF THE INVENTION

Figure 1:
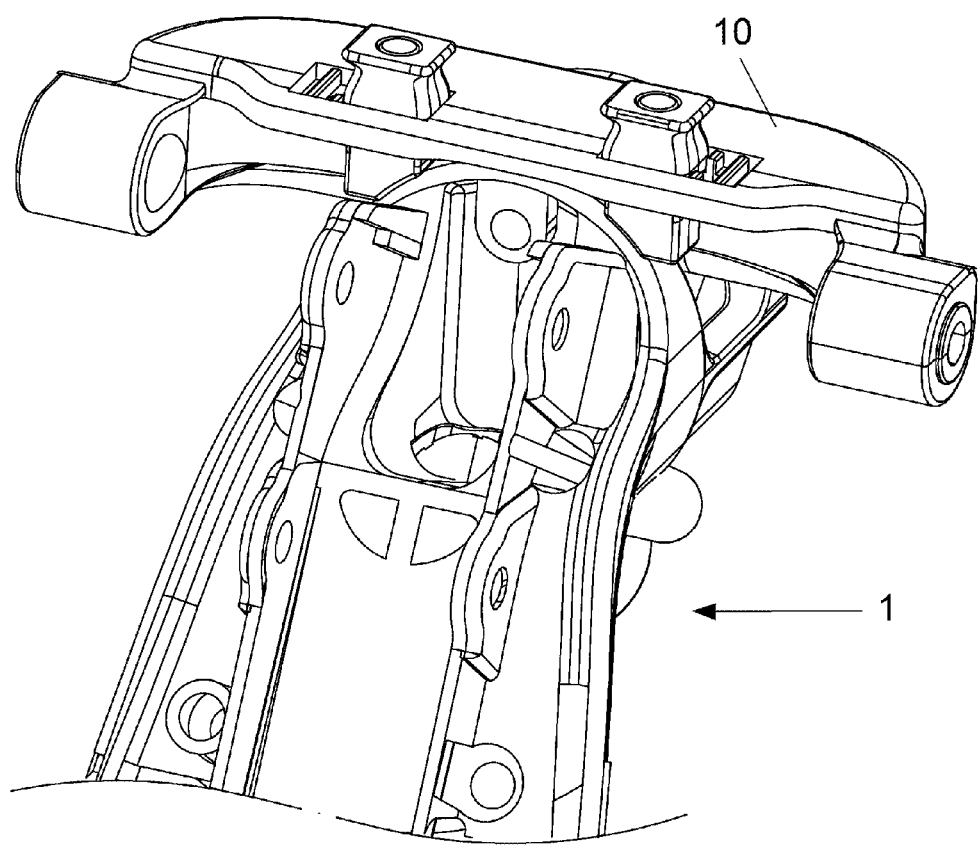
FIG. 1 is a perspective view of a front, bottom portion of a push scooter having a pivot angle setting mechanism according to the invention where a zero pivot angle of the steering bar is set.
Figure 2:
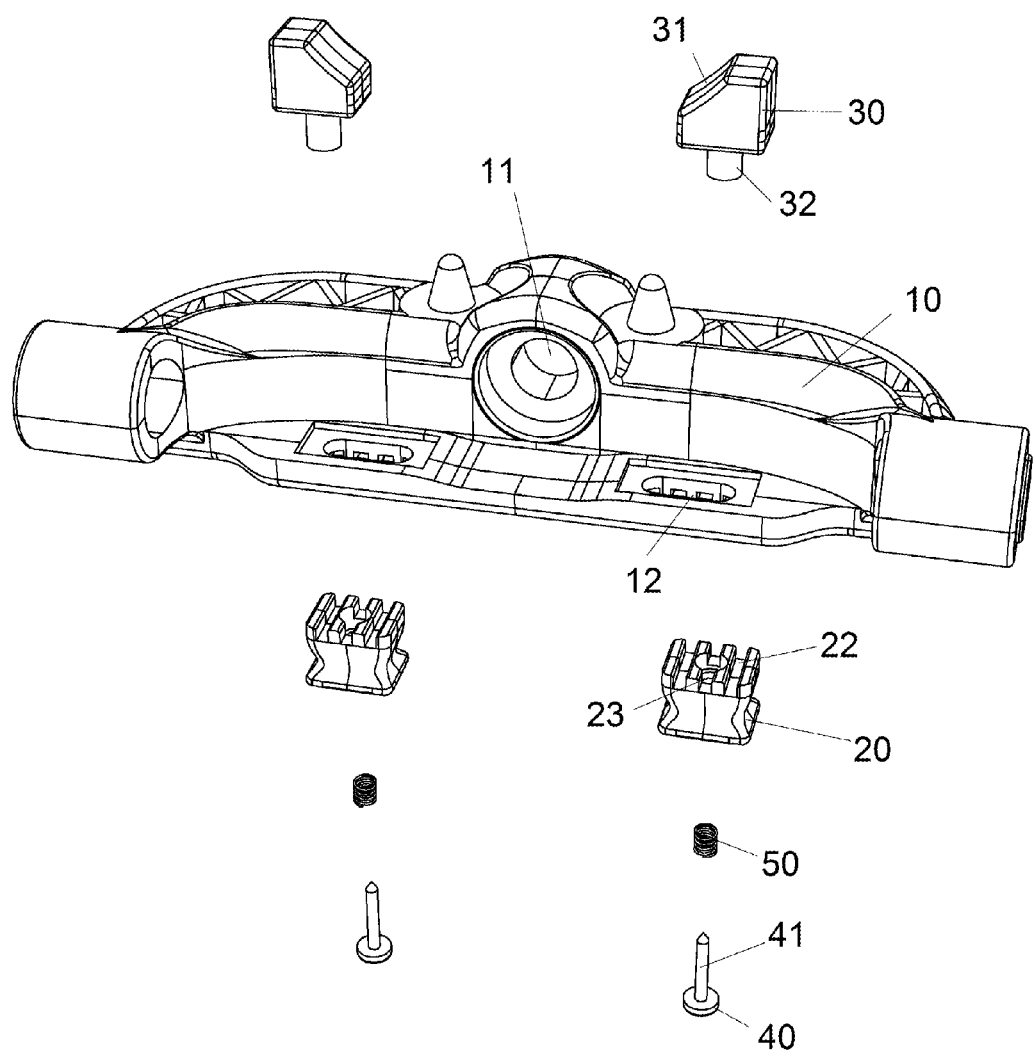
FIG. 2 is an exploded view of the pivot angle setting mechanism.
Figure 3:
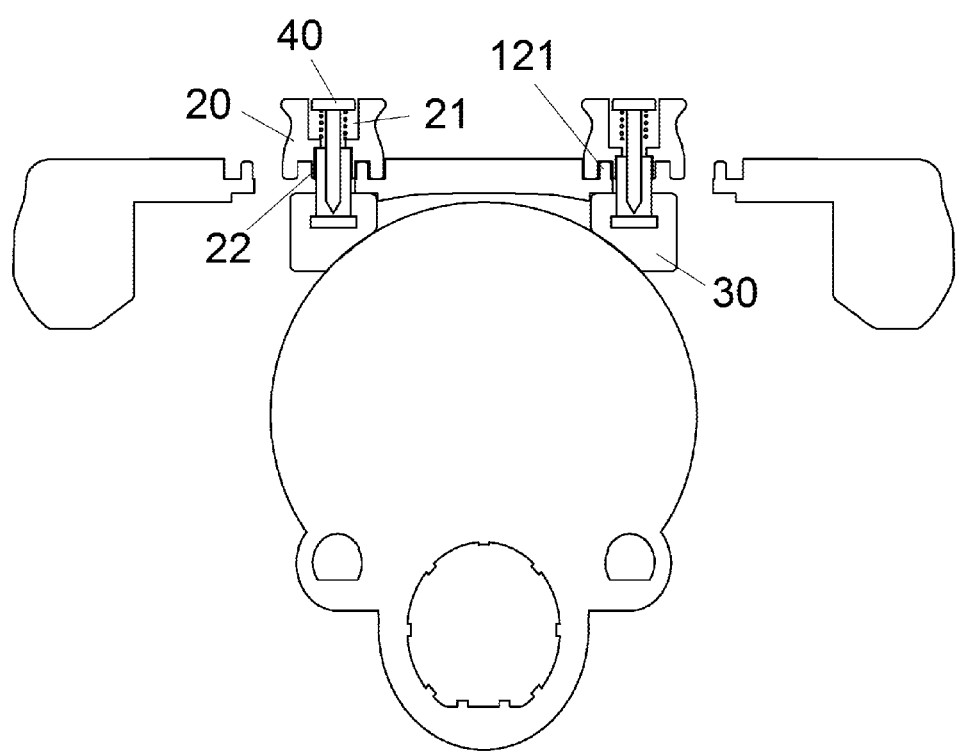
FIG. 3 schematically depicts the pivot angle setting mechanism.

Referring to FIGS. 1 to 4, a pivot angle setting mechanism of the invention comprises a mount 10 secured to a front end of a push scooter 1, the mount 10 having two ends with two wheels (not shown) mounted thereon respectively, a central hole 11 with a steering bar (not shown) pivotably fastened therein, and two openings 12 each between the hole 11 and either end, the opening 12 having two parallel projections 121 on two sides respectively; two sliding members 20 each comprising a cavity 21 on one end, three parallel grooves 22 on the other end wherein two grooves 22 complimentarily engage the projections 121 respectively, and a channel 23 communicating the cavity 21 with the central groove 22; two limit members 30 each comprising a concave surface 31 engaged the steering bar in the position of FIG. 1, and a hollow peg 32 in the opening 12; two pins 40 each disposed in the cavity 21 and having a shank 41 fastened in the peg 31 by passing through the channel 23; and two compression springs 50 each put on the shank 41.

Figure 4:
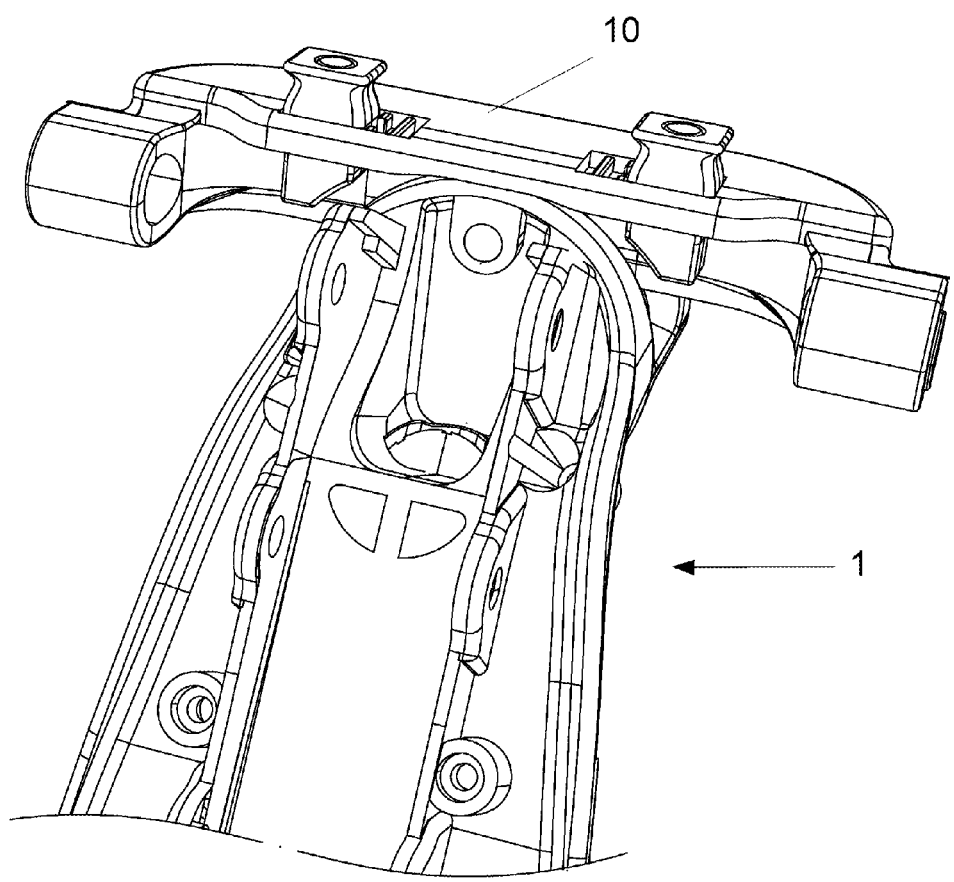
FIG. 4 is a view similar to FIG. 1 where a pivot angle of the steering bar is set.

For setting a pivot angle of the steering bar from the one shown in FIG. 1 (e.g., zero pivot angle) to the one shown in FIG. 4, a person may pull the sliding members 20 to clear the grooves 22 out of the projections 121 with the compression springs 50 compressed, move the sliding members 20 and the limit members 30 outward laterally until a desired position is reached, and release the sliding members 20 with the compression springs 50 expanded and the projections 121 disposed in the grooves 22 again. As shown in FIG. 4, the steering bar can pivot an angle from a position when the steering bar contacts the concave surface 31 of one limit member 30 to a position when the steering bar contacts the concave surface 31 of the other limit member 30.

While the invention has been described in terms of preferred embodiments, those skilled in the art will recognize that the invention can be practiced with modifications within the spirit and scope of the appended claims.

What is claimed is:

1. A pivot angle setting mechanism comprising:
   a mount secured to a front end of a push scooter, the mount including a central hole and two openings each between the central hole and either end, each opening having two parallel projections on two sides respectively;
   two sliding members each including a cavity on one end, three parallel grooves on the other end wherein two of the grooves complimentarily engage the projections respectively, and a channel communicating the cavity with a central one of the grooves;
   two limit members each including a concave surface and a hollow peg in the opening; and
   two spring biased pins each disposed in the cavity and having a shank fastened in the hollow peg by passing through the channel.

* * * * *